Jan. 16, 1923.

A. F. J. WRIGHT.

1,442,774.

AUTOMATIC TURNING MACHINE, SCREW MAKING MACHINE, AND THE LIKE.

FILED APR. 15, 1921.

Inventor
A. F. J. Wright.
By
Hubert A. Gill.
Attorney

Jan. 16, 1923.

A. F. J. WRIGHT.

AUTOMATIC TURNING MACHINE, SCREW MAKING MACHINE, AND THE LIKE.

FILED APR. 15, 1921.

Inventor
A. F. J. Wright.
Hubert A. Gill
Attorney

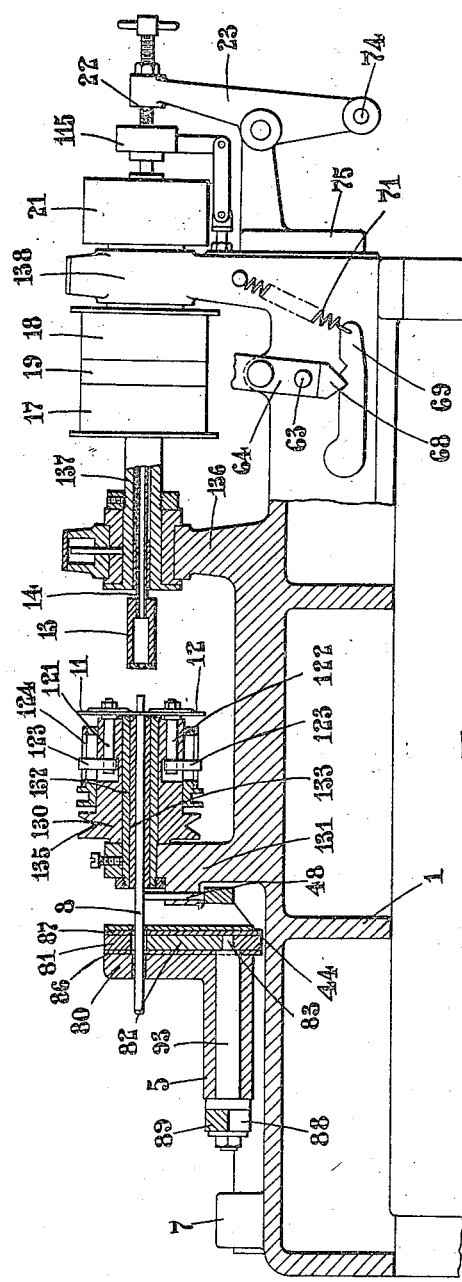

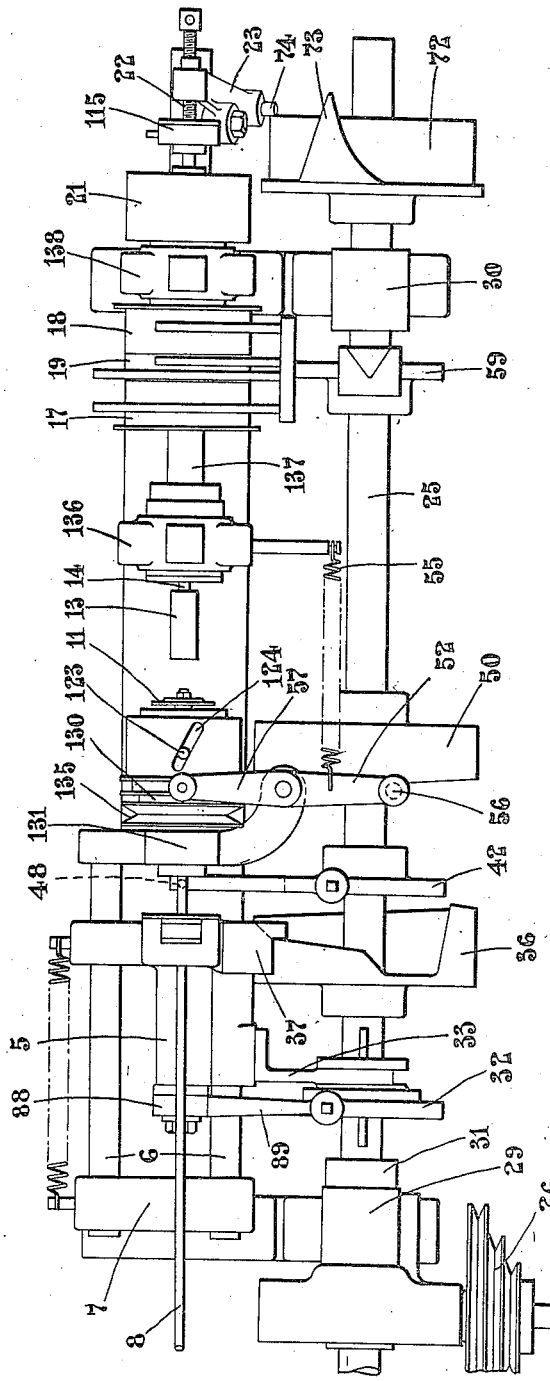

Patented Jan. 16, 1923.

1,442,774

UNITED STATES PATENT OFFICE.

ALBERT F. J. WRIGHT, OF WALTHAMSTOW, ENGLAND, ASSIGNOR TO D. GILSON & COMPANY, LIMITED, OF WALTHAMSTOW, ESSEX, ENGLAND.

AUTOMATIC TURNING MACHINE, SCREW-MAKING MACHINE, AND THE LIKE.

Application filed April 15, 1921. Serial No. 461,603.

*To all whom it may concern:*

Be it known that I, ALBERT FREDERICK JAMES WRIGHT, a subject of the King of Great Britain, and resident of Billet Works, Billet Road, Walthamstow, in the county of Essex, England, have invented certain new and useful Improvements in Automatic Turning Machines, Screw-Making Machines, and the like (for which I have filed an application in England, dated April 30th, 1920), of which the following is a specification.

This invention relates to automatic machines such as are used for cutting screws and other small articles from bars or rods of metal stock. Hitherto it has been the general practice to construct such machines so that the bars of stock are held in a rotating chuck, while the turning, cutting and like tools do not rotate during the cutting operation, but are only fed along the projecting end of the stock bar, so that the rotation of the bar against the tools effects the cutting. The bar is released from the chuck and fed forward after the parting off of each screw or the like as it is formed, and is re-engaged with the chuck so as to leave a fresh projecting length to be operated upon. When a bar of stock is used up, a trip device operates to stop the machine, and it remains standing until an attendant comes to it, inserts a fresh bar of stock, and re-starts the machine. Apart from this loss of time, which may halve the maximum output of a machine in practice, other time is lost due to the intervals which must elapse between the operation of one tool and another on the bar.

In order to improve the output and efficiency, I have now designed a machine which can be operated with stock from a coil or reel, so that it can be fed in continuously for a long time before any stoppage is necessary. The stock is straightened by a straightening mechanism of a suitable type before it is fed in to be cut. As a coil or reel of metal cannot be rotated conveniently, I have designed a machine in which it is the tools which are rotated while the bar or stock only requires to have a longitudinal feed imparted to it at intervals. In designing a machine to operate in this manner I have found it possible to introduce various other practical improvements as hereinafter set forth, which are of value in themselves, whether a coil of wire or straight bars of stock are used.

The principle upon which the new machine in its preferred form operates for cutting screws is as follows: After a finished screw has been cut off, the slide begins to feed forward the next length of the stock. The cutting and parting tools are mounted on a revolving cage which runs continuously, the tools being secured upon spindles carried in the cage so as to bring one or other tool into action as required; this is effected by a slotted sleeve engaging with arms on the tool spindles, and only requiring to be moved longitudinally to produce the required angular movement of the tool spindles. While the first part of the forward feed of the stock is taking place, the cutting or turning tool or tools are in action, turning down the length of the stock which is to be the shank of the screw. At or shortly before the end of this operation, the threading tool which may be on a spindle sliding through the sleeve which carries the other tools, is moved up into position for engaging with the end of the shank of the stock, and is turned so as to cut the thread. When the required length of the shank has been threaded, a trigger device operates to reverse the drive of the screw spindle and to back it off. The stock may be advanced a further distance corresponding to the depth of the head of the screw to be formed, either before or after the thread has been cut, or during the cutting, and finally the parting tool is brought into action, to sever the threaded and headed portion of the stock. The product so formed only requires the head slotting to form the finished screw, which operation is performed on a separate machine. The cage carrying the tools is preferably enclosed in a guard which catches the swarf thrown out and also catches and delivers the screws as they are cut off and thrown out of the cage. The spindle carrying the threading tool is made hollow, and a continuous flow of lubricant is maintained through it, in order to enable all of the cutting and threading operations to be performed efficiently, and to wash out the swarf from the tool cage. The forms of the faces of the cutting tool and of the parting tool will determine the shape of the head of the screw, giving for example a cheese-headed shape if straight faced tools are used, or a coned shape if the cutting tool has a chamfered leading edge, a round-headed shape if the parting tool is recessed to this form, and so forth. The shape can also be varied by imparting longitudinal motion to the stock while the tool spindles are being turned to bring the tools out of or into action, and so forth. Time can be economized by causing the threading tool to follow upon the cutting tool before it finishes the turning down of the shank, or by allowing the parting tool to operate while the threading and backing off of the threading tool are being completed. The revolving cage carrying the turning and parting tools may be carried on a bracket at the front, and thus supported separately from the spindle of the threading tool as hereinafter explained.

In the accompanying drawings:—

Figure 9 is an elevation partly in section, and

Figure 10 a plan view showing an alternative form of construction of the machine.

Figure 11:
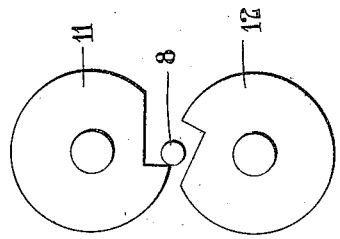

Figure 11 is a detail view showing the preferred form of the turning and parting tools.

Figure 4:
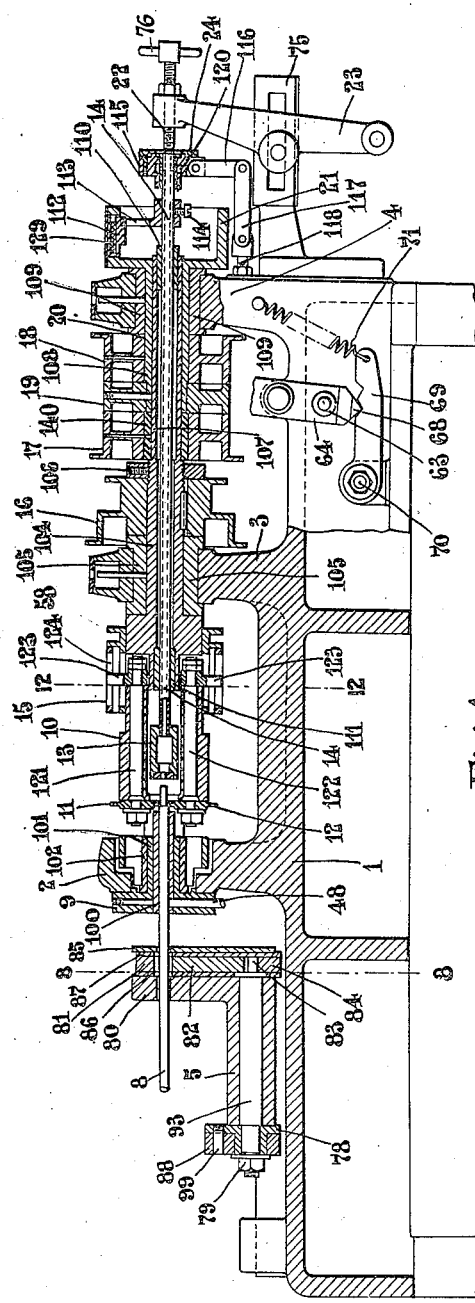
Figure 4 is a longitudinal sectional elevation taken on the line 4—4 of Figure 3.
Figure 12:
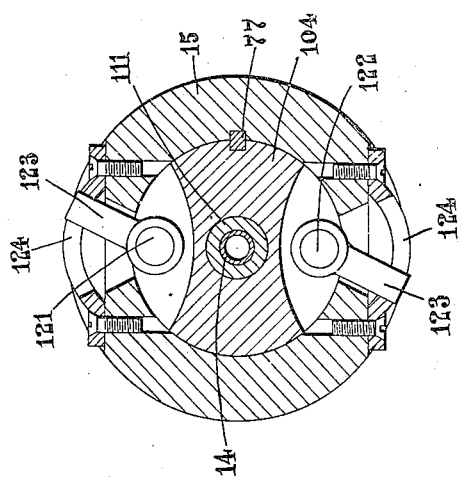

Figure 12 shows a section of the tool box on the line 12—12 of Figure 4.

Referring first to Figures 1 to 8, the machine has a cast bed 1 on which are formed three brackets 2, 3 and 4. 5 is a slide working on a pair of rods 6, 6, secured between the base of bracket 2 and a bracket 7 at the left-hand end of the bed. The slide 5 carries gripping jaws serving for feeding forward the workpiece 8 which is illustrated in the form of a wire such as might be delivered from a coil of wire. The bracket 2 has at the left-hand side thereof a disc 9 carrying a gripping device hereinafter described whereby the wire 8 is held while the gripping device carried by the slide 5 is released to move back and take a fresh grip of the work.

Between the brackets 2 and 3 is mounted a cage 10 carrying the turning and parting tools 11 and 12, and also having inside it the threading tool 13 which is carried on a tubular spindle 14 which extends through the brackets 3 and 4, as hereinafter explained. A collar 15 movable longitudinally on the cage 10 serves for operating the turning and parting tools 11 and 12 in the manner hereinafter explained. 16 is a stepped pulley at the right-hand of the bracket 3, for driving the cage 10. 17 and 18 are loose pulleys and 19 a fast pulley secured to a sleeve 20 which actuates the threading tool 13 through a trigger mechanism contained in the shell 21, as hereinafter explained. 22 is a screw stem mounted in an arm 23 by means of which a disc 24 mounted on the end of the revoluble tubular spindle 14 is pushed toward the left at the start of a threading operation.

Figure 1:
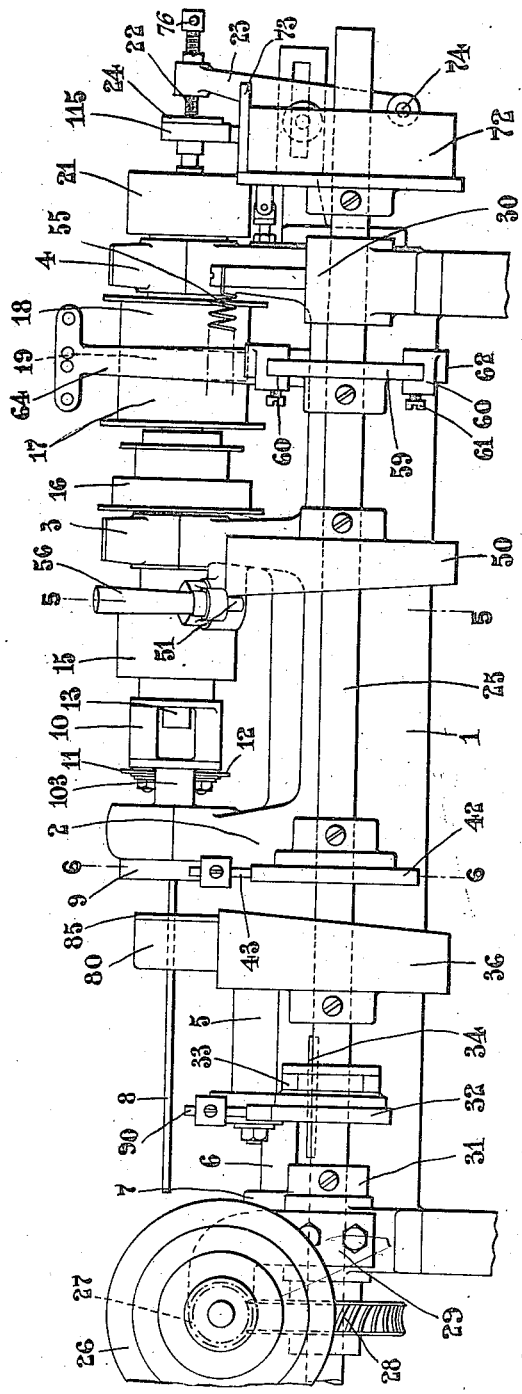
Figure 1 shows in front elevation one form of construction of the machine according to the invention.
Figure 2:
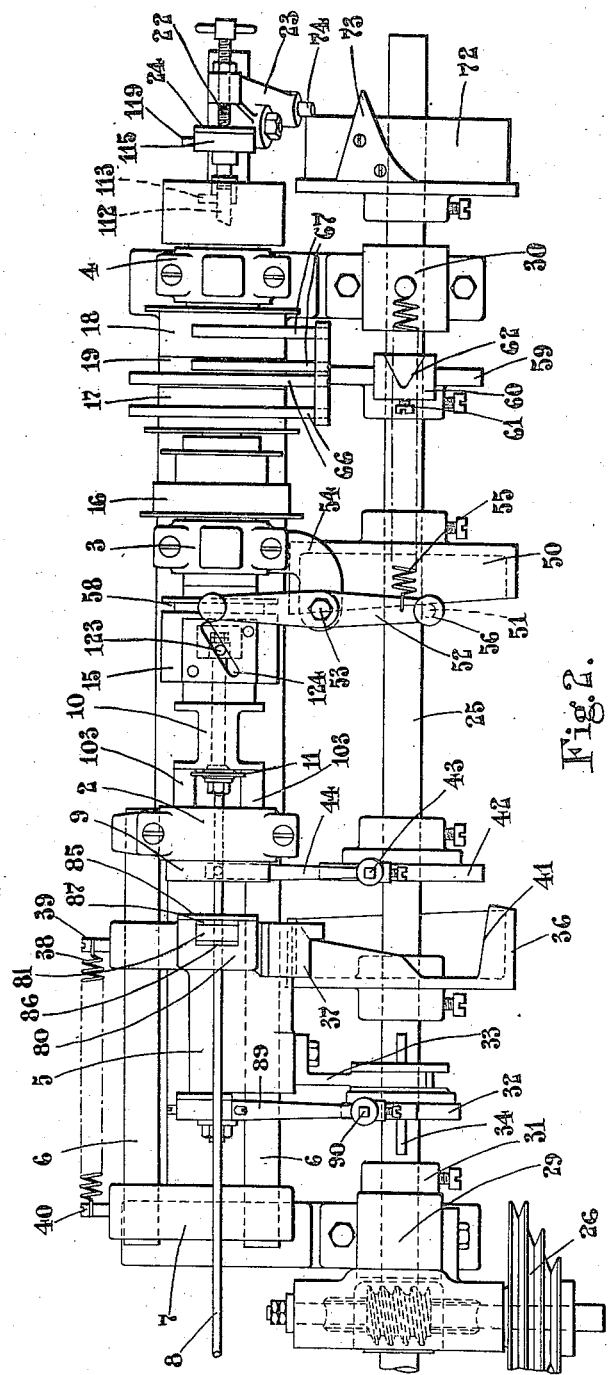
Figure 2 shows a plan view of Figure 1.

Referring now to Figure 2, 25 is a cam shaft extending along the front of the bed of the machine and driven from belt pulleys 26 through a worm and worm wheel 27, 28, at any required speed according to the size of the wire or rod which is being operated upon, the speed of cutting required and so forth. The cam shaft 25 is carried in brackets 29, 30, at the left and right-hand ends of the bed respectively, and is held against longitudinal movement on the one hand by the worm wheel 28 and on the other hand by a collar 31 secured to the shaft. The cams carried by the shaft 25 are as follows: A cam 32 which is seen in end view in Figure 8 has a groove in the boss thereof in which engages a forked arm 33 secured to the feed slide 5. The cam 32 slides upon a feather 34 on the shaft 25. The cam 32 therefore moves longitudinally with the feed slide 5 while it rotates with the shaft 25. The cam 36 operates against a projection 37 on the slide 5 in order to move this longitudinally toward the right in Figure 2, while a spring 38 connected at one end to a pin 39 on slide 5 and at the other end to a pin 40 on the bracket 7 draws the slide 5 toward the left when allowed to do so by the face 41 of the cam releasing the projection 37. 42 is a cam secured to the shaft 25 and operating upon a pin 43 mounted in the end of a lever arm 44. This lever arm is pivoted at 45 on the bracket 2 and the end 43 of the arm is normally drawn downward by a spring 46. The rear end of the arm 44 carries an adjustable screw stud 47 which serves to press up a pin 48 in the disc 9 for gripping the rod 6.

The next cam on the shaft 25 is the cam 50 which bears upon a pin or roller 51 on a lever 52, this lever in turn being pivotally supported at 53 on an arm 54 projecting from the bracket 3. The forwardly projecting arm of the lever 52 is normally drawn to the right as seen in Figure 2, by a spring 55 keeping it in contact with the face of the cam 50. A handle 56 which may be an extension of the pin 51 enables the lever to be moved by hand when required. The rear arm of the lever is formed as a fork 57 engaging with a groove 58 in the sliding collar 15.

The next cam on the shaft 25 is a disc 59 carrying two wipers 60 adjustably secured thereon by screws 61, and each formed with projecting cam faces 62. These cam faces operate upon a pin or roller 63 on the lower arm of a belt-shifting lever 64 which is pivotally supported at 65 on the base of the machine. The upper end of the lever carries pairs of rods 66 and 67 between which run open and crossed belts operating upon the pulleys 17, 18, 19. The lower end of the lever 64 is formed with a V-shaped projection 68 adapted to engage with notches in an arm 69 which is pivoted at 70 inside the base of the machine and is drawn upwardly by means of a spring 71, as seen in Figure 4. This serves to hold the belt-shifting lever when thrown over by the wipers 60 toward one side and the other respectively, insuring accurate positioning of the belts on the pulleys.

The last cam on the shaft 25 consists of a drum 72 with a cam face 73 secured thereon adapted to strike against a projecting pin or roller 74 on the lower arm of the lever 23. The lever 23 is mounted by means of a pivoted pin adjustable longitudinally in a slotted bracket 75 projecting outwardly from the right-hand end of the bed of the machine. This enables the operating position of the lever 23 to be adjusted as required, while a star wheel or the like 76 on the end of the screw stem 22 in the upper arm of lever 23 allows of fine adjustment.

Figure 3:
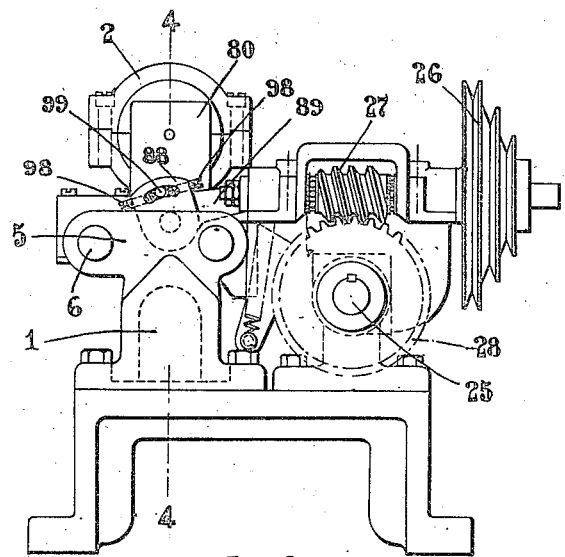
Figure 3 is an elevation as seen from the left-hand end of Figure 1.
Figure 6:
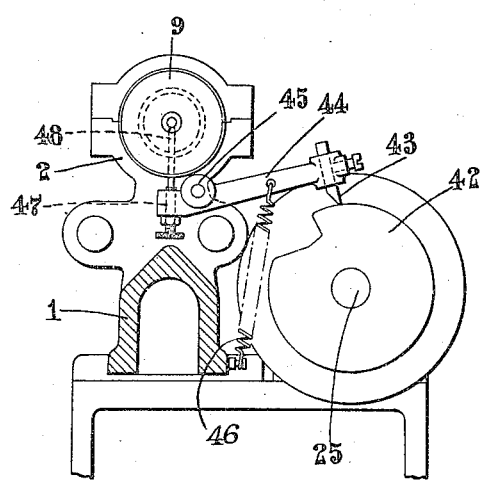
Figure 6 shows a cross-section on the line 6—6 of Figure 1.
Figure 5:
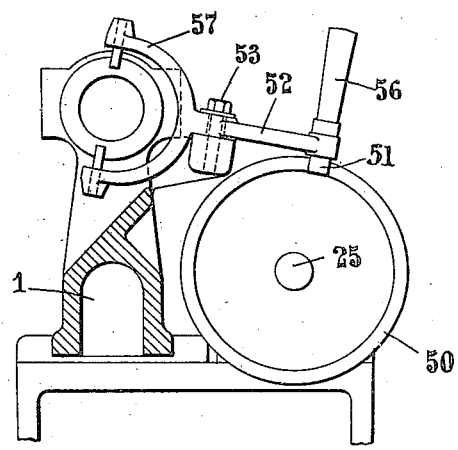
Figure 5 shows a cross-section on the line 5—5 of Figure 1.
Figure 7:
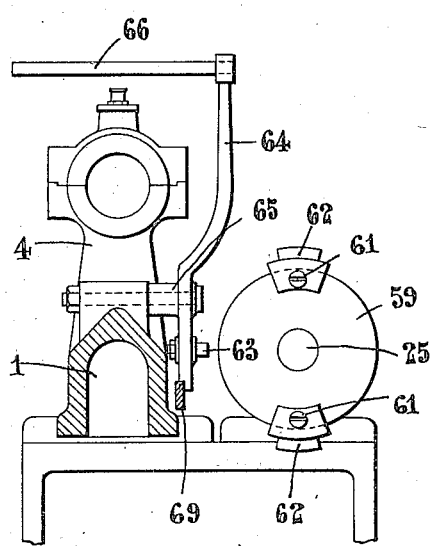
Figure 7 shows in end elevation the belt shifting mechanism.
Figure 8:
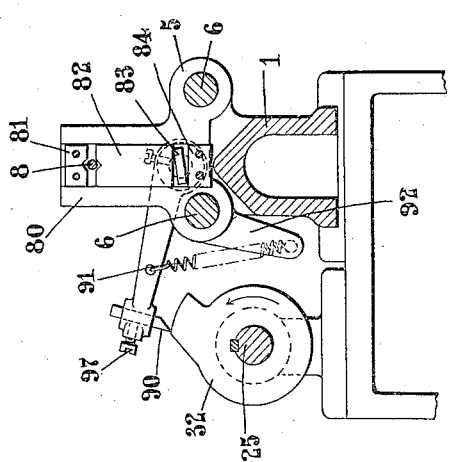
Figure 8 shows a section of the gripping mechanism for the workpiece in section on the line 8—8 of Figure 4 looking from right to left.

It will be convenient now to describe the operation of the respective portions of the mechanism, and we will deal first with the feed of the stock. The slide 5 has an upwardly projecting grooved column 80 at its right-hand end in which are mounted two plates 86, 87, having secured between them at the top a block 81 with a notched jaw at its under face. Another block 84 is secured between the plates 86, 87, at the bottom and between the plates slides a movable jaw 82 with a notch at the top. This jaw is adapted to be pressed up by a cam 83 bearing against the block 84 which draws down the jaw 81 at the same time as it presses up the jaw 82. A plate 85 encloses at the right-hand side the plates 86, 87, and the jaws working between them. The cam 83 is on a spindle 93 which passes through the slide 5 and has a boss 88 at its end from which projects a lever 89 carrying an adjustable pin 90 bearing upon the cam 32. The lever 89 is drawn down by a spring 91 as seen in Figure 8, in a direction such as to tend to keep the pin 90 bearing upon the surface of the cam 32. The spring 91 is secured at its lower end to an arm 92 projecting from the slide 5. Figure 8 shows the mechanism with the jaws released, but on the turning of the shaft 25 when the pin 90 slips over the end of the projecting cam face, the spring 91 will pull down the arm 89 causing the cam 83 to operate so as to press down the block 84 carrying the upper jaw 81, and to press up the lower jaw 82 for gripping the stock again. The stock 8 of course passes through a hole in the column 80 and the plate 85, and through slots in the plates 86, 87, so that it is free to pass through between the jaw blocks 81, 82. The boss 88 is mounted on a bush 78 clamped by a nut 79 on the end of spindle 93 so that the boss may be adjusted in angular position on the bush. This adjustment is effected by means of screws 98 (Figure 3), clamping between them a pin 99 which projects from the flange of the bush 78 (Figure 4) and can move in a slot in the boss 88 as seen in Figure 3, according to the adjustment of the screws 98. The adjustment is effected so that the pin 90 will not come in contact with the circumference of the cam disc 32 when it is released from the projecting cam face, so that the spring 91 may be effective in operating the gripping jaws 81, 82, upon the stock 8. This adjustment is not essential however, when the pin 90 which bears on the cam is itself adjustable in the arm 89 by the set screw 97. Both methods of adjustment are shown in Figures 3, 4 and 5 of the drawings, but either alone may be used. In Figure 8, for example, only the adjustable pin 90 is shown in the end of the arm 89, this arm being assumed to be rigidly secured on the spindle 93 carrying the cam 83.

The operation of this part of the mechanism is as follows: When the rod 48 is caused to grip the stock in the disc 9 at the side of bracket 2, under the action of cam 42 and lever 44, the cam 32 comes into the position of Figure 8, lifting the lever 89 and releasing the gripping jaws 81, 82. Thereupon the projection 37 on the slide 5 drops down the face 41 of cam 36, while the slide 5 is drawn back by the spring 38. Immediately thereafter the pin 90 drops down the sharp face of the cam 32, and the jaws 81, 82 again grip the stock 8. The long inclined face of the cam 36 then commences to push the projection 37 with the slide 5 toward the right, feeding the stock toward the right against the cutting tool 11 which is then in operation, and ultimately against the threading tool 13 which comes into action to thread the stem reduced to the required diameter by the cutting tool 11. When a screw or other article has been completed and the next feed of the stock is required to take place, the rod 48 will have come into action to grip the stock again and the same sequence of operations of the slide 5 and the gripping jaws will take place. In place of the feeding mechanism described, any other suitable feeding mechanism such as one of the collet type might be used if preferred.

The stock 8 is fed through an interchangeable bush or tube 100 fitted in the disc 9, which in turn is fitted inside the left-hand end of the bracket 2. Bushes 100 are used of different sizes according to the correct size of the stock in use. The disc 9 has a boss 101 into which the bush 100 is fitted, and around which turns a socket member 102 carried on arms 103 projecting from the cage 10. This serves to support the left-hand of the cage or tool carrier concentrically with respect to the stock 8. The cage 10, as seen in Figure 4, is formed in one with a tubular extension 104 which passes through the bracket 3 and turns in suitable bearings 105 therein. The pulley 16 is mounted on the end of a tubular spindle 104 at the right-hand side of the bracket 3 and is held in place by a collar 106. Beyond the collar 106 the spindle 104 is continued in a reduced portion 107 on which rotates the sleeve 108. This sleeve rotates in bearings 109 in the bracket 4, and carries the fast pulley 19, while the loose pulley 18 turns freely on the sleeve 108. The other loose pulley 17 has a bush 140 by which it is supported to turn on the hollow spindle 107 between the sleeve 108 and the shoulder on which the collar 106 fits. At its right-hand end the portion 107 of the spindle projecting from the tool cage 10 carries a bush 110 through which the tubular spindle 14 passes. This serves to hold the tubular spindle 14 centrally. A similar bush 111 keeps the other end of the tubular spindle centered in the revolving portion 104 of the tool-carrying spindle.

The shell 21 at the end of the sleeve 108 carries an interchangeable trigger block 112 which is engaged by an arm 113 adjustably secured by a set screw 114 on the tubular spindle 14. The block 112 engaging with the arm 113 serves to transmit the drive first in one direction and then in the other from the fast pulley 19 and the sleeve 108 to the tubular spindle 14 carrying the threading tool 13. Lubricant is fed through the spindle 14 to the threading tool through a box 115 secured to the disc 24 on the end of the tubular spindle 14. The box 115 is held against rotation by means of links 116 and 117 connected to a stud 118 on the bracket 4. The box 115 is hollow as seen in Figure 4, and lubricant is fed thereto by a flexible tube or the like connected to a socket 119 on the box, as seen in Figure 2. The lubricant reaches the interior of the tubular spindle 14 through holes 120 therein, as seen in Figure 4. It passes longitudinally through the tubular spindle 14 to the threading tool 13 and escapes through the slots of the cage 10.

The turning and parting tools 11 and 12 are mounted on spindles 121, 122, inside the cage 10, and these spindles carry outwardly projecting pins 123 which work in inclined slots at 124, in plates secured at the opposite faces of the collar 15, assuming that there is only one turning tool and one parting tool to be operated, as shown in Figure 12. The collar 15 slides by a feather or loose key 77 on the body 104 of the cage 10, as seen in Figure 12. The longitudinal movement of the collar 15 under the action of lever 52 serves to turn the pins 123 and so to turn the spindles 121, 122, in order to bring the turning tool 11 and the parting tool 12 into operation as required. The turning tool 11 operates continuously during the feed of the stock by means of the gripping slide 5, until the required length of the stem of the screw has been turned. The parting tool 12 operates subsequently to cut off the threaded screw when the feed has progressed far enough to leave the required thickness for the head of the screw. The slots at 124 in the plates carried by the collar 15 may be of any required form in order to bring the tools into action to the proper extent and in the proper sequence, but in the drawings straight slots are shown, the form of the cam 50 being relied upon to bring the one tool into action to the required extent and for the required period by movement of the collar 15 in one direction, while movement of the collar 15 in the opposite direction turns the turning tool 11 out of operation, and subsequently brings into action the parting tool 12 which operates while the stock is stationary and is gripped by the rod 48 during the receding movement of the gripping slide 5. The cage 10 may carry more than two tools thereon, and these may be operated in any required sequence by suitable actuation of a collar such as 15 by means of a cam as described. The preferred form of the tools is indicated in Figure 11 in which it is seen that they are formed as discs with notches therein, the notches being formed with faces which are approximately radial or even undercut, leaving a cutting edge at the angle between the radial face and the circumference. The direction of cutting is such that the swarf is thrown outwardly away from the circumference of the cutting disc and does not tend to choke up the notch in this latter.

The threading tool 13 may be of any suitable type, either for threading the stem of the workpiece externally as shown, or for boring it out and tapping it internally and so forth, according to requirements. It will be understood that in the operation of the device as shown, after the stem of the workpiece has been turned to the required diameter by the tool 11, or while it is being so turned, the lever 23 will operate to push up the disc 24 on the end of the tubular spindle 14, driving this rapidly toward the left in Figure 4. If the trigger 113 was not in engagement with the block 112 before this, the engagement will commence at once, and the block 112 will drive round the trigger 113 with the tubular spindle 14 and the threading tool 13, turning them in the required direction for applying the thread to the screw. The lever 23 falls back directly after the threading tool is engaged with the workpiece, as the further longitudinal movement of the threading tool on the workpiece is automatic owing to the cutting of the screw thread. The trigger block 112 may be spring-mounted, and its forward driving face may be inclined at the end so that it will allow the trigger 113 to slip past the same when the end of the threading movement is reached, whether the belts have been shifted over to reverse the drive of the pulley 19 or not. The chamfered end of the block 112 is indicated in dotted lines in Figure 2, while the spring 129 pressing the block 112 toward the left is seen in Figure 4. Then on reversal of the belts when the shell 21 starts to rotate in the reverse direction, the rear face of the trigger block 112 will strike against the trigger 113 again and will turn the tube 14 backwardly to screw off the threading tool 13 from the workpiece. While this is occurring the parting tool 12 will generally be cutting off the finished screw.

It will be seen that the cam shaft 25 must be driven at such a speed that a complete sequence of operations is carried through forming a complete screw, for example, at each revolution of the cam shaft 25. Screws with heads of any desired form may be used by employing parting tools for example with suitably shaped cutting or rounding faces.

Various modifications in the construction of the machine may be made without departing from the scope of the invention. Figures 9 and 10 illustrate one comparatively obvious modification. In this case the revoluble head 130 carrying the tools 11, 12 on spindles 121, 122 as before, is carried in a bracket 131 corresponding with the bracket 2 in Figures 1 to 8. The revoluble head 130 is carried on a stationary sleeve 132 secured to the bracket 131, and the bush 133 through which the stock 8 passes, is inside the sleeve 132. The operation of the tools 11 and 12 by means of suitably shaped slots 124 in plates carried by a collar 134 will be understood from the description of Figures 1 to 8, as the operation is effected by the action of a lever 52, 57, and a cam 50 corresponding precisely with the lever and cam similarly numbered in Figures 1 to 8. The revoluble head 130 is provided with a belt groove 135 for driving purposes. The threading tool 13 is in this case on the end of a short spindle 14 carried through a bracket 136 corresponding with the bracket 3 in Figures 1 to 8. The revoluble sleeve 137 on which the fast pulley 19 is fixed and around which the loose pulleys 17 and 18 turn corresponds with the sleeve 108 in Figures 1 to 8, while the bracket 138 corresponds with the bracket 4 in Figures 1 to 8. The remaining parts of the mechanism including the shell 21 of the trigger mechanism and the lever 23 for pushing up the tubular spindle 14 are identical with those already described in connexion with Figures 1 to 8 and will need no further description here.

One advantage of the construction of Figures 9 and 10 is that there is a clear space in front of the end of the screw after it has been threaded and while it is being parted off. This can be utilized to enable an automatic transferrer of a known type to be used, this transferrer sliding over the shank of the screw so as to receive it as it is parted, and then moving aside and presenting the head of the screw to a saw which slots the head. The screw then falls from the transferrer in a finished condition. Such transferrers and slotting devices are known as applied to other screw-making machines, and will require no further description here.

Another advantage is that the threading tool is exposed and not confined in a cage, so that any known form of multiple tool of the nature of a capstan could be substituted for the parts carried by the bracket 136, in case two or more operations were to be performed successively.

The two examples of construction according to the invention given above are not exhaustive, but any other equivalent arrangement may be adopted which allows of the separate support and driving of the turning and parting tools, and of the threading tool or another tool such as a drill which may replace this latter, and which allows of the movements necessary to bring the respective tools into action in the proper sequence as required. Instead of pulleys for driving the tools, of course gears may be used, with means for reversal of the drive in the case of the threading tool spindle.

The machine in either form is applicable for use with stock of any size or shape, if the dimensions of the guides, the grippers, and the cutting and threading tools are suitably chosen. The feeding of stock from a coil can only be done in the case of stock of comparatively small diameter. For larger sizes straight stock bars must be used fed in one after another longitudinally, but even for these the machine has practical advantages over those in which the stock itself is rotated.

When the stock is fed from a coil, it will generally be passed through straightening rolls before being delivered to the feeding mechanism. Although the machine has been described as being used for cutting screws, it can also be used with suitably shaped tools for cutting any other small article from wires or bars of stock.

Having thus described my invention what I claim as new and desire to secure by Letters Patent is:—

1. In an automatic machine for turning, screw making and the like, the combination of a revolving tool holder, a bush concentric with said tool holder through which the stock to be operated upon is adapted to be fed, means for feeding forward the stock intermittently and for holding it stationary, said means comprising a slide with gripping jaws adapted to engage the stock, means for holding said gripping jaws in engagement during the forward movement of the slide, a stationary gripping device and means for holding it in operation while the gripping jaws on said slide are released, and means including a revolving cam shaft adapted to reciprocate said slide and to effect the release of the gripping jaws thereon during its backward movement, and adapted to release said stationary gripping device while said slide is moving forwardly, and means controlled by said cam shaft adapted to control the operation of the tools of the revolving tool holder.

2. In an automatic machine for turning, screw making and the like, the combination of a revolving tool holder adapted to carry cutting tools, a separate revoluble tool holder adapted to carry threading tools and the like, a spindle extending from said separate tool holder, a reversible belt driving gear, a block carried by the driven member of said belt driving gear, a trigger carried by said spindle, a bush concentric with said tool holders through which the stock to be operated upon is adapted to be fed, means for feeding forward the stock intermittently and for holding it stationary, and means including a revolving cam shaft adapted to control the feed of the stock, to control the reversal of said belt driving gear, and to effect the pushing of said spindle in a direction such as to bring its trigger into engagement with said block when the separate tool holder is required to be brought into action.

3. In an automatic machine for turning, screw making and the like, the combination of a feeding mechanism adapted to move forward intermittently the stock to be operated upon and to hold said stock against rotation, a bush through which said stock is adapted to be fed, a revoluble tool cage with a plurality of tools carried thereby and means for supporting said tool cage concentrically with the said bush, a separate revoluble tool holder and a spindle supporting the same concentrically with said bush, a reversible driving mechanism for said spindle, a collar and means operated thereby for throwing into and out of operation the respective tools carried by said tool cage, and means including a revoluble cam shaft adapted to control the operation of said stock feeding mechanism, the operation of said collar, and the operation of said reversible driving mechanism of said spindle.

ALBERT F. J. WRIGHT.